US012779712B2

(12) United States Patent
Miller et al.

(10) Patent No.: US 12,779,712 B2
(45) Date of Patent: Nov. 3, 2026

(54) TWO-IN-ONE CARPET AND UTILITY KNIFE

(71) Applicant: Q.E.P. Co. Inc, Boca Raton, FL (US)

(72) Inventors: Bradley Scott Miller, Boca Raton, FL (US); Joseph Deguglimo, Boca Raton, FL (US)

(73) Assignee: Q.E.P. Co., Inc., Boca Raton, FL (US)

( * ) Notice: Subject to any disclaimer, the term of this patent is extended or adjusted under 35 U.S.C. 154(b) by 195 days.

(21) Appl. No.: 18/533,738

(22) Filed: Dec. 8, 2023

(65) Prior Publication Data

US 2025/0187216 A1 Jun. 12, 2025

(51) Int. Cl.
*B26B 5/00* (2006.01)

(52) U.S. Cl.
CPC .................................... *B26B 5/005* (2013.01)

(58) Field of Classification Search
CPC ........... B26B 5/005; B26B 5/00; B26B 29/00; B26B 29/02
USPC .............. 30/2, 151–153, 155–157, 162, 280, 30/286–290, 294, 314, 317, 329, 340
See application file for complete search history.

(56) References Cited

U.S. PATENT DOCUMENTS

| | | | | |
|---|---|---|---|---|
| 3,045,348 A * | 7/1962 | Dungan | A22C 9/008 | 30/304 |
| 7,155,829 B1 * | 1/2007 | Sun | B26B 5/003 | 30/162 |
| 7,322,985 B2 * | 1/2008 | Lee | A61B 17/144 | 606/71 |
| 2014/0053408 A1 * | 2/2014 | Ho | B26B 27/005 | 30/152 |

* cited by examiner

*Primary Examiner* — Phong H Nguyen
(74) *Attorney, Agent, or Firm* — Vedder Price P.C.

(57) ABSTRACT

A two-in-one carpet and utility knife has a handle and a double sided head, each side of the head adapted to receive a different type of knife blade, and a retainer configured to secure one type of blade to one side of the head and to secure a different type of blade to a different side of the head.

7 Claims, 2 Drawing Sheets

TWO-IN-ONE CARPET AND UTILITY KNIFE

FIELD

This application relates to a two-in-one knife, one example of which is a two-in-one carpet and utility knife.

BACKGROUND

The subject matter discussed in this background section should not be presumed to be prior art or analogous art merely as a result of its inclusion in this background section. Similarly, a problem mentioned in this background section or associated with the subject matter of his background section should not be presumed to have been previously recognized in the prior art. Rather, the subject matter in this background section merely represents different approaches, which, in and of themselves, may also be inventions.

In a variety of professional crafts, as well as in a variety of "do-it-yourself" or "DIY" activities, it is often desirable, and frequently preferred, and potentially necessary, to have two different types of knife blades readily available for use. A non-limiting example is in the installation of carpet. A traditional carpet knife blade is an extremely thin rectangular blade, typically with multiple cutting edges, and with square corners which make it harder to accidentally cut too deep through the carpet and thus make it harder to accidentally damage anything beneath the carpet such as hardwood flooring.

A conventional utility knife blade has a propensity to snap if too much cutting force is applied. Utility knife blades are designed for general purpose cutting and have a distinct trapezoidal shape with two edges formed as cutting edges. Utility knives may, of course, be used to cut carpet but are more difficult to use for this purpose when compared to a carpet knife and as indicated, there is a propensity for the blade to snap.

Therefore, a need exists for a single knife that can provide distinct cutting blades and, in one example, a single knife that can provide both a utility cutting blade and a carpet cutting blade.

SUMMARY

A single knife, preferably with a single knife head, that provides for distinct cutting blades, preferably of different types, and more preferably provides for a utility blade and a carpet blade.

In a non-limiting embodiment, the knife includes a single retainer that may be used to secure each type of blade in its proper position.

BRIEF DESCRIPTION OF THE FIGURES

In the following drawings, like reference numerals are used to refer to like elements. Although the following figures may depict a single embodiment or example, the figures should not be interpreted in isolation but rather in the context of the specification and thus the invention is not limited to the embodiment or example depicted.

DETAILED DESCRIPTION

Figure 1:
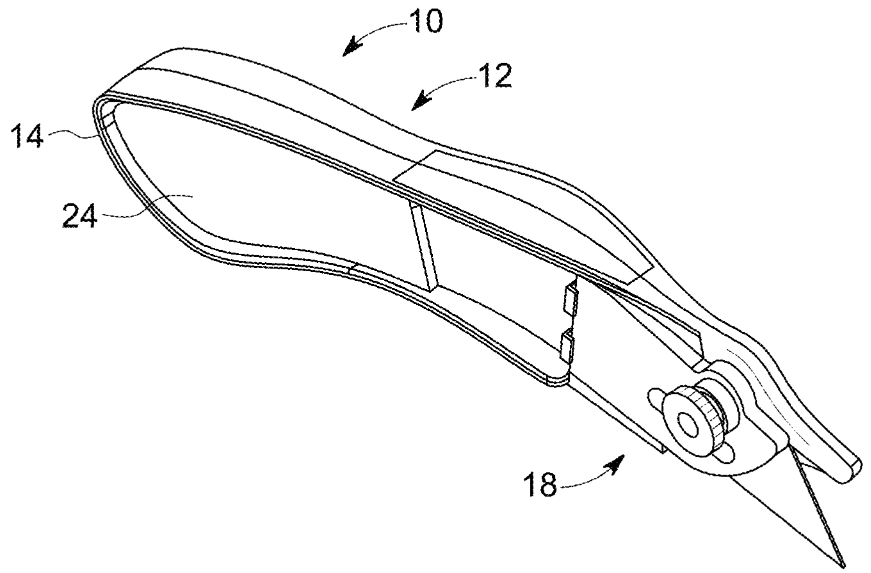
FIG. 1 is a perspective illustration of one side of a two-in-one knife.
Figure 2:
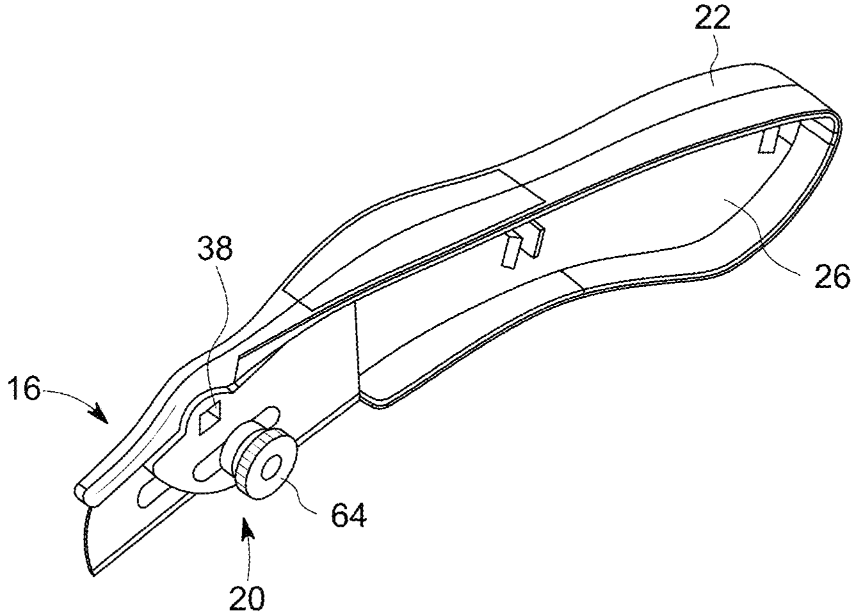
FIG. 2 is a perspective illustration of a second side of a two-in-one knife.
Figure 3:
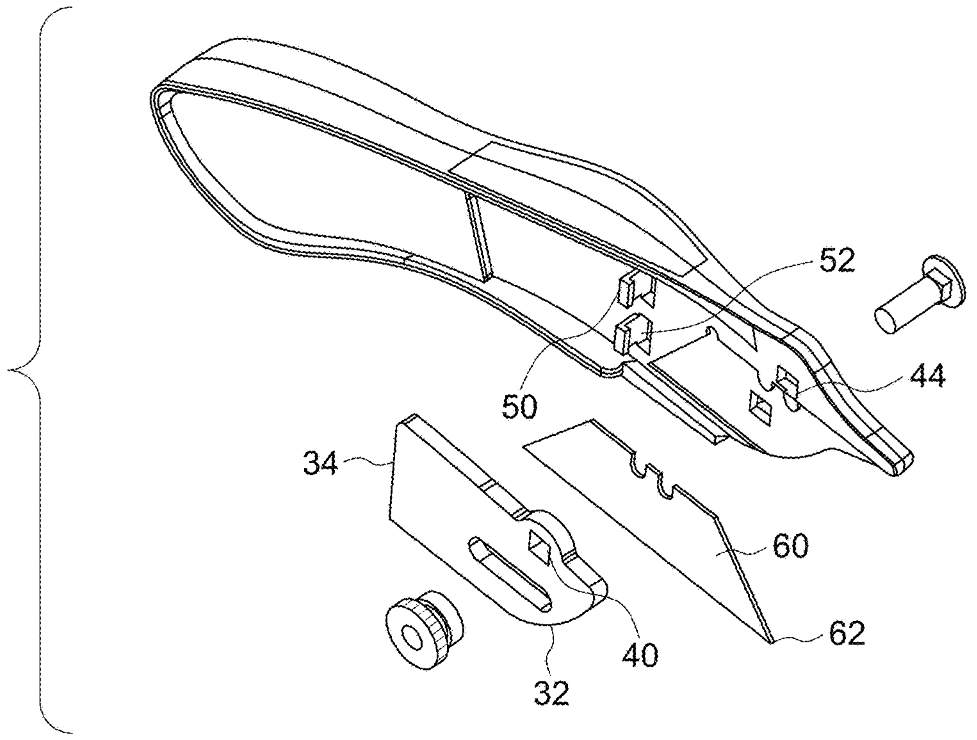
FIG. 3 is an exploded illustration of one side of a two-in-one knife.
Figure 4:
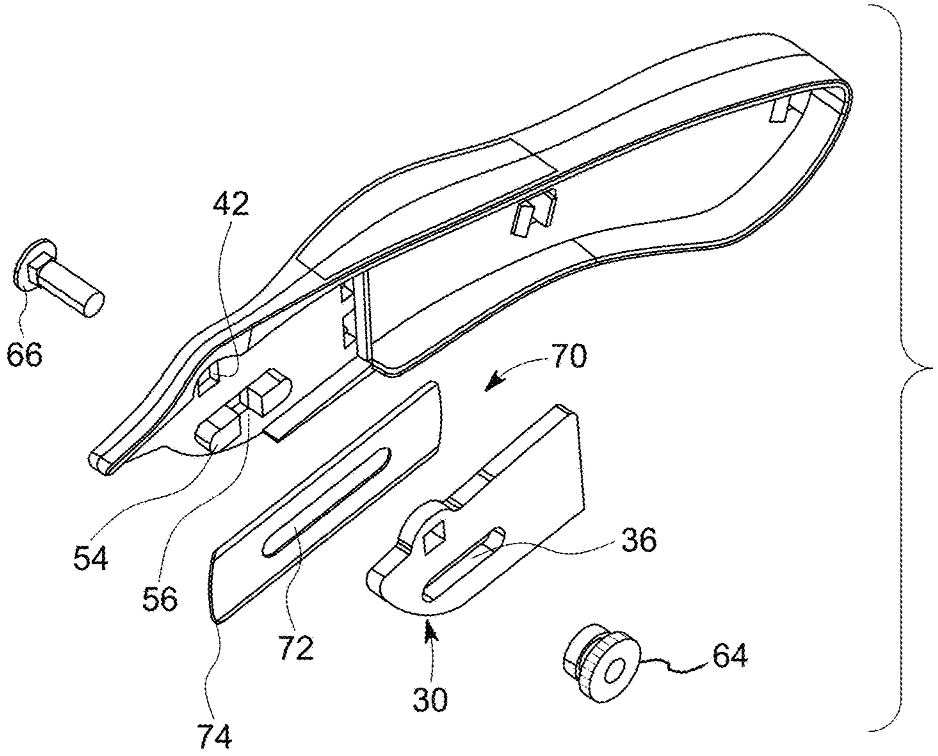
FIG. 4 is an exploded illustration of a second side of q two-in-one knife.

Although various embodiments or examples of the invention may have been motivated by various deficiencies with the prior art which may be discussed or alluded to in one or more places in the specification, those embodiments or examples do not necessarily address any, much less all, of those deficiencies. In other words, different embodiments or examples of the invention may address deficiencies that may not be discussed in the specification. Some embodiments or examples may only partially address some deficiencies or just one deficiency.

Referring to the Figures, a two-in-one knife 10 includes an elongated handle 12 and first and second ends 14, 16. The handle may take one of a variety of shapes and configurations. One or more heads may be positioned at each end or, alternatively, two (or more) heads may be positioned at the same end. For explanatory and non-limiting purposes, first and second heads 18, 20, are positioned at the second end 16.

The handle is illustrated as having a generally "I" shaped cross-section including a generally flat portion 22 and first and second opposed generally flat sides 24, 26. The generally flat portion 22 may extend from the top of the second end 16, along the length of the handle, along the first end 14 of the handle, and then along the bottom of the handle toward the second 16, but stopping short of the second end to provide clearance for knife blades as will be explained in greater detail.

A retainer 30 is provided to secure each type of knife blade in the proper position in the knife heads 18, 20. In a non-limiting example, the retainer 30 is a generally flat elongated rectangular plate having one generally curved end 32 and an opposed generally straight end 34. The retainer includes an elongated slot 36 therethrough, the slot being generally parallel to the elongated length of the retainer. The top of the retainer includes an upward projection 38 generally at the extending from the top adjacent the curved end 32 and an aperture 40 extending through the projection. Preferably the handle and retainer are formed of plastic, but other materials may be used.

Each handle head includes a recess 42 to receive the projection 38 of the retainer as will be explained, and an aperture 44 is provided through the recess 42 and thus extends through the first and second heads of the handle.

The first side 24 of the head includes one or more projections 50 extending outwardly generally parallel to the top of the handle. If there are two or more projections, they are preferably vertically aligned, i.e., generally perpendicular to the elongated axis of the handle. Each extension includes a forwardly opening notch 52.

The second side 26 of the head includes one or more projections 54 extending outwardly generally perpendicular to the top of the handle. If there are two or more projections, they are preferably horizontally aligned, i.e., generally parallel to the elongated axis of the handle. An aperture 56, preferably between the projections 54, extends through the first and second heads of the handle.

A conventional utility knife blade 60 is of generally trapezoidal shape having two oppositely angled edges interconnecting smaller and larger parallel edges with knife blade points or corners 62 at the intersection of the angled edge and the larger parallel edge.

When it is desired to use the knife as a utility knife, the blade 60 is inserted in the first head 18 with the knife corners 62 extending downwardly. The retainer 30 is placed over the blade 60 with the straight end of the retainer engaged within the notch 52 of the projection 50. The upward projection 38 of the retainer 30 is positioned within the recess 42.

The retainer is preferably secured to the first flat side of the first head through the use of a threaded nut and bolt combination 64, 66. The bolt extends from the second head through the aperture 44 and through the retainer aperture 40 in the handle first end and the nut is then applied to the bolt 66. The blade 60 is thus securely maintained in the first knife head by the pressure applied by the retainer 30 secured by the nut and bolt. The second end 16 of the handle may extend in a longitudinal direction beyond the corner 62 of the utility blade to reduce the risk of accidental injury to the user. The nut and bolt combination may be loosened and withdrawn to remove the utility blade.

A conventional carpet blade 70 is a generally rectangular shape having an elongated slot 72 therethrough and knife blade points or corners 74 at one or more of the corners of the blade.

When it is desired to use the knife as a carpet knife, the blade 70 is inserted in the second head 20 with the knife corners 74 extending downwardly and with the elongated slot 72 positioned over the projections 54. The retainer 30 is placed over the blade 70 with the upward projection 38 of the retainer 30 positioned within the recess 42. The bolt 66 is preferably inserted from the first head through the aperture 56 and extends from between the projections 54, through the elongated slot 72 and through the elongated slot 36 of the retainer 30. The nut is then applied to the bolt. The blade 70 is thus securely maintained in the second knife head by the pressure applied by the retainer 30 secured by the nut and bolt. The nut and bolt combination may be loosened and withdrawn to remove the carpet blade.

The nut and screw may be used to secure the retainer 30 when the knife is not in use even though no blade is present.

Each embodiment or variation disclosed herein may be used or otherwise combined with any other embodiment or variation.

Although the invention has been described with reference to specific embodiments, examples and variations, it will be understood by those skilled in the art that various changes may be made and/or equivalents may be substituted without departing from the spirit and scope of the invention and/or without departing from the essential teachings of the invention. The invention, therefore, should be limited only by the scope of the claims and equivalents thereof.

What is claimed:

1. A two-in-one knife comprising:

a handle;

a head operatively coupled to the handle;

the head having a first side and a second side, wherein the first side of the head is adapted to engage a first type of blade and the second side of the head is adapted to engage a second type of blade; and a single retainer, said single retainer adapted to secure the first type of blade to the first side of the head and the second type of blade to the second side of the head, the second type of blade being different from the first type of blade, wherein each side of the head includes a recess to selectively receive said single retainer;

wherein said single retainer is an elongated plate;

wherein the head includes two projections with a notch provided on one side of the head to engage said retainer;

wherein two other projections are provided on the other side of the head and an aperture is provided through the head intermediate between the two projections, and wherein the two projections and the aperture are configured to retain one of the two types of blade.

2. The two-in-one knife of claim 1, wherein one of the first and second types of blades is a carpet blade and one of the first and second type of blades is a utility blade.

3. The two-in-one knife of claim 1, wherein said retainer has two apertures therethrough.

4. The two-in-one knife of claim 3, wherein one of said apertures in said retainer is an elongated slot.

5. The two-in-one knife of claim 3, wherein the two apertures are different and one of the two apertures is adapted to secure the first type of blade to the first side of the head with a fastener, and wherein the other of one of the two apertures is adapted to secure the second type of blade to the second side of the head with the same fastener.

6. The two-in-one knife of claim 1, wherein said single retainer has a first side and a second side, wherein said retainer is adapted to interchangeably secure the first type of blade to the first side of the head with the first side of said retainer proximate the first side of the head, and wherein said retainer is adapted to interchangeably secure the second type of blade to the second side of the head with the second side of said retainer proximate the second side of the head.

7. The two-in-one knife of claim 1, wherein the head includes two apertures therethrough.

* * * * *